(12) United States Patent
Pentia

(10) Patent No.: US 12,555,946 B2
(45) Date of Patent: Feb. 17, 2026

(54) APPARATUS FOR EXPOSING AND COVERING A CHARGING PORT OF A VEHICLE

(71) Applicant: Dr. Ing. h.c. F. Porsche Aktiengesellschaft, Stuttgart (DE)

(72) Inventor: Bogdan Pentia, Ostfildern (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 278 days.

(21) Appl. No.: 18/370,438

(22) Filed: Sep. 20, 2023

(65) Prior Publication Data

US 2024/0136755 A1    Apr. 25, 2024
US 2024/0235093 A9    Jul. 11, 2024

(30) Foreign Application Priority Data

Oct. 19, 2022    (DE) ............... 10 2022 127 405.5

(51) Int. Cl.
  *H01R 13/447*    (2006.01)
  *B60L 53/16*    (2019.01)
  *E05F 15/638*    (2015.01)

(52) U.S. Cl.
  CPC ............ *H01R 13/447* (2013.01); *B60L 53/16* (2019.02); *E05F 15/638* (2015.01); *E05Y 2900/53* (2013.01); *H01R 2201/26* (2013.01)

(58) Field of Classification Search
  None
  See application file for complete search history.

(56) References Cited

U.S. PATENT DOCUMENTS

| 11,466,496 | B2 * | 10/2022 | Shin ................. E05D 15/165 |
| 2016/0137081 | A1 | 5/2016 | Takahashi et al. |
| 2023/0151668 | A1 | 5/2023 | Winker et al. |
| 2024/0018821 | A1 * | 1/2024 | Ha .................. H01R 13/5213 |

FOREIGN PATENT DOCUMENTS

| CN | 213768277 U | | 7/2021 | |
| CN | 114852189 A | * | 8/2022 | ............ E05F 15/697 |
| DE | 102015206715 A1 | | 10/2016 | |
| DE | 102020209607 A1 | * | 12/2021 | ............ B60K 15/05 |
| DE | 102020209609 A1 | * | 12/2021 | ............ B60K 15/05 |
| DE | 102020130235 A1 | | 5/2022 | |
| DE | 102021129941 A1 | | 5/2023 | |
| FR | 2968345 A1 | * | 6/2012 | ............ E05F 15/635 |
| KR | 20220033728 A | * | 3/2022 | ............... F16H 1/16 |
| WO | WO-2022101465 A1 | * | 5/2022 | ............... B60K 1/00 |

* cited by examiner

*Primary Examiner* — Tho D Ta
(74) *Attorney, Agent, or Firm* — Buchanan Ingersoll & Rooney PC

(57) ABSTRACT

An apparatus for exposing and covering a charging port having a cover, which is movable between a closed position, in which the charging port is covered by the cover, and an open position, in which the charging port is exposed by the cover, using a combined drive-and-guide device, which is moved inwardly from its closed position in relation to an outer skin comprising the charging port. In order to simplify the apparatus for exposing and covering a charging port having a cover, the combined drive-and-guide device includes a gearwheel/rack combination operatively connected to the cover and having two racks arranged in parallel and meshing with a respective gearwheel. The two gearwheels are electromotively driven about a common axis of rotation.

14 Claims, 5 Drawing Sheets

APPARATUS FOR EXPOSING AND COVERING A CHARGING PORT OF A VEHICLE

CROSS-REFERENCE TO RELATED APPLICATION

This application claims priority to German Patent Application No. 10 2022 127 405.5, filed Oct. 19, 2022, the content of such application being incorporated by reference herein in its entirety.

FIELD OF THE INVENTION

The invention relates to an apparatus for exposing and covering a charging port having a cover, which is movable between a closed position, in which the charging port is covered by the cover, and an open position, in which the charging port is exposed by the cover, using a combined drive-and-guide device, which is moved inwardly from its closed position in relation to an outer skin comprising the charging port. The invention further relates to a motor vehicle having a charging port.

BACKGROUND OF THE INVENTION

Chinese utility model specification CN 213768277 U, which is incorporated by reference herein, discloses an electric vehicle having a charging tray module arranged on a bumper, a charger cover being pivotable outwardly from a closed position into an open position. German disclosure document DE 10 2020 130 235 A1, which is incorporated by reference herein, discloses an engine-powered cover apparatus for covering and exposing a charging port arranged on the body of an electric vehicle in relation to a vehicle outer region having a body opening that can be covered by a charger cover, the charger cover being arranged in an open position (not visible) behind a body element comprising the body opening. German disclosure document DE 10 2015 206 715 A1, which is incorporated by reference herein, discloses an apparatus for opening and closing a charger cover of a vehicle, whereby the charger cover covers a charging compartment arranged within the outer skin of the vehicle, in which a charging socket is arranged, the charger cover being arranged within the charging compartment in the open state and is guided on a guidance device arranged within the charging compartment such that it can be pushed underneath the outer skin surrounding the charging compartment opening in the manner of a sliding door. American disclosure document US 2016/0137081 A1, which is incorporated by reference herein, discloses a charger cover that is split in two, with two separately displaceable charger cover elements, thereby enabling a body opening to be fully or only partially exposed.

SUMMARY OF THE INVENTION

Described herein is a way to simplify the exposing and covering of a charging port having a cover, which is movable between a closed position, in which the charging port is covered by the cover, and an open position, in which the charging port is exposed by the cover, using a combined drive-and-guide device, which is moved inwardly from its closed position in relation to an outer skin comprising the charging port.

In an apparatus for exposing and covering a charging port having a cover, which is movable between a closed position, in which the charging port is covered by the cover, and an open position, in which the charging port is exposed by the cover, using a combined drive-and-guide device, which is moved inwardly from its closed position in relation to an outer skin comprising the charging port, in that the combined drive-and-guide device comprises a gearwheel/rack combination operatively connected to the cover and having two racks arranged in parallel and meshing with a respective gearwheel, the two gearwheels being electromotively driven about a common axis of rotation. In particular "operatively connected" means that the cover performs a controlled, guided movement between its closed position and its open position, and vice versa, during operation over the service life of the apparatus. The cover can also be referred to as a charger cover, although the cover does not pivot in a flap-like manner between its open position and its closed position. In its open position, the cover is arranged behind the outer skin so as to be offset relative to the charging port. Via the offset arrangement, the cover exposes a charging interface which is accessible via the charging port. In its closed position, the cover covers the charging interface in the charging port. The cover can be guided stably between its two end positions using the combined drive-and-guide device having the two gearwheels and the two racks. Increased additional construction costs thereby are deliberately accepted.

One preferred embodiment of the apparatus is characterized in that the two racks are fixedly connected to a movable guidance component, which cooperates with a housing-fixed guidance component. The housing-fixed guidance component comprises, e.g., an electric motor fixedly attached to a housing in which the combined drive-and-guide device is accommodated. The movable guidance component is in turn movable in the housing relative to the housing-fixed guidance component. The additional constructive cost of the movable guidance component having the two racks is in this case also deliberately accepted in order to ensure a stable and reproducible movement of the cover inwardly from its closed position relative to the outer skin.

A further preferred embodiment of the apparatus is characterized in that a support frame for the cover is attached to the movable guidance component. The support frame is advantageously fixedly connected to the racks on the movable guidance component. The support frame for the cover simplifies the assembly of the apparatus significantly, because the cover advantageously need only be attached to the support frame after the mounting of the apparatus to a motor vehicle.

A further preferred embodiment of the apparatus is characterized in that the drive-and-guide device comprises a double slotted guide for the support frame. The double slotted guide simplifies an automatic opening and closing of the cover before and after a charging operation.

A further preferred embodiment of the apparatus is characterized in that the combined drive-and-guide device is integrated into a charging tray module having a housing comprising a housing tray which delimits a receptacle space for the support frame when the cover is in its closed position. The cover can thus be protected against environmental factors in its closed position. The receptacle space for the support frame having the cover is advantageously sized and designed such that the movable component can perform all movements without disruption when covering and exposing the charging port having the cover. With the aid of the charging tray module, the charging port can advantageously be placed at different locations on the outer skin of a motor vehicle and equipped with the cover.

A further preferred embodiment of the device is characterized in that the drive-and-guide device is attached to the housing tray. Constructive advantages are thereby achieved with regard to the achievement of a multi-functional housing for the charging tray module. The housing tray of the charging tray module can, e.g., be combined with a housing rear wall in order to form the housing of the charging tray module. However, the housing tray can also be attached to an existing component of the motor vehicle so that a housing rear wall can be omitted.

A further preferred embodiment of the device is characterized in that the housing tray comprises a fastening frame that surrounds the cover which, in its closed position, is attached to the support frame. The fastening frame can advantageously be used to fasten the housing tray to the outer skin. A stable enclosure of the charging port can therefore be achieved with the fastening frame.

A further preferred embodiment of the device is characterized in that the housing tray comprises fastening means for fastening the charging tray module in or on a motor vehicle. The fastening means can comprise fastening eyes and/or fastening tabs that, in combination with suitable fastening means, in particular fastening screws, enable a stable fastening of the housing tray internally to an outer skin or to a suitable support structure of a motor vehicle equipped with the apparatus.

A further preferred embodiment of the apparatus is characterized in that the racks arranged in parallel each comprise a respective lifting portion and a pushing portion. The lifting portion and the pushing portion are arranged substantially perpendicular to one another. The lifting portion, in cooperation with one of the gearwheels, advantageously enables movements at the beginning of an opening movement and at the end of a closing movement of the cover. The pushing portion enables a translational movement or a method of the cover relative to the charging port at the end of the opening movement and at the start of the closing movement of the cover. On the one hand, a complete closure of the charging port with the cover is enabled thereby. On the other hand, complete exposure of the charging port by the cover in its closed position is enabled.

In a motor vehicle with a charging port, the aforementioned apparatus is mounted from behind to the outer skin of the motor vehicle, which outer skin delimits the charging port. The charging port can be provided anywhere on the body of the motor vehicle. The charging port can also be integrated into a functional part of the motor vehicle, e.g. into a bumper. The combined drive-and-guide device, in particular the charging tray module, is advantageously arranged to be offset from the charging port such that the cover, in its closed position, closes the charging port, while the cover, in its open position, fully exposes the charging port. The cover initially moves somewhat inwardly from its closed position. The cover behind the outer skin then moves in a translational manner out of the region of the charging port.

The invention can also relate to a charging tray module, a combined drive-and-guide device, a cover, a charging tray, and/or a single part for a device described hereinabove. The specified parts can be purchased separately.

BRIEF DESCRIPTION OF THE DRAWINGS

Further advantages, features, and details of the invention arise from the following description, in which various exemplary embodiments of the invention are described in detail with reference to the drawings.

DETAILED DESCRIPTION OF THE INVENTION

Figure 1:
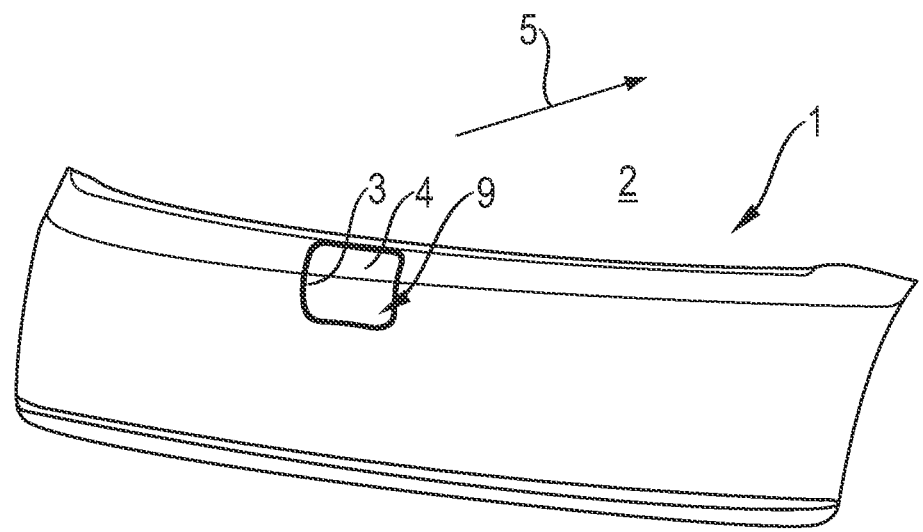
FIG. 1 depicts a perspective view of a bumper having a charging port closed by a cover.

FIG. 1 shows a perspective view of a bumper 1 of a motor vehicle 2 (indicated only by a reference character). A forward direction of travel of the motor vehicle 2 is indicated in FIG. 1 by an arrow 5.

The bumper 1 is a rear bumper of the motor vehicle 2. The motor vehicle 2 is an electric vehicle that can be recharged using a charging cable (not shown) via a charging port 3. In FIG. 1, the charging port 3 is closed by a cover 4, which can also be referred to as a charger cover.

Figure 2:
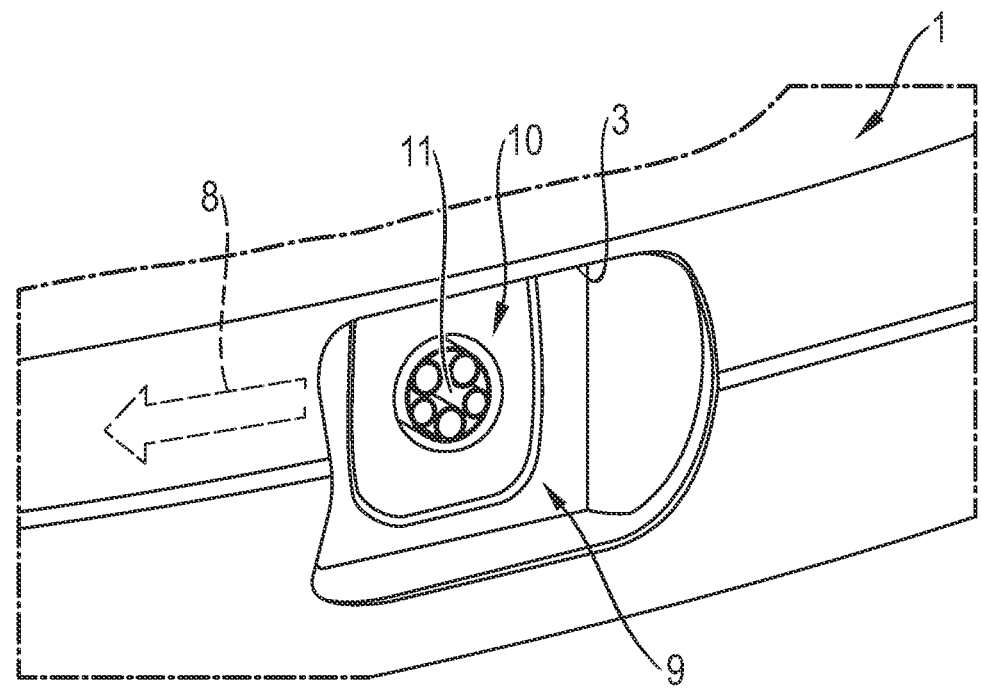
FIG. 2 depicts the charging port on the bumper of FIG. 1 in an opened state.

In FIG. 2, an excerpt of the bumper 1 from FIG. 1 with the charging port 3 opened (shown in an enlarged view). In FIG. 2, an opening movement is indicated by an arrow 8, via which the cover bearing the reference character 4 in FIG. 1 is moved from its closed position shown in FIG. 1 into its open position. In its open position, the cover 4 is not visible, as can be seen in FIG. 2. In the open position of the cover 4, the charging port 3 is fully exposed.

In FIG. 2, it can be seen that a charging socket 10 with a mating face 11 is arranged in the bumper 1 behind the opened charging port 3. The charging socket 10 with the mating face 11 serves as a charging interface or charging connector apparatus 9 on the motor vehicle 2. This charging interface is accessible on the motor vehicle 2 through the charging port 3 in the bumper 1.

Figure 3:
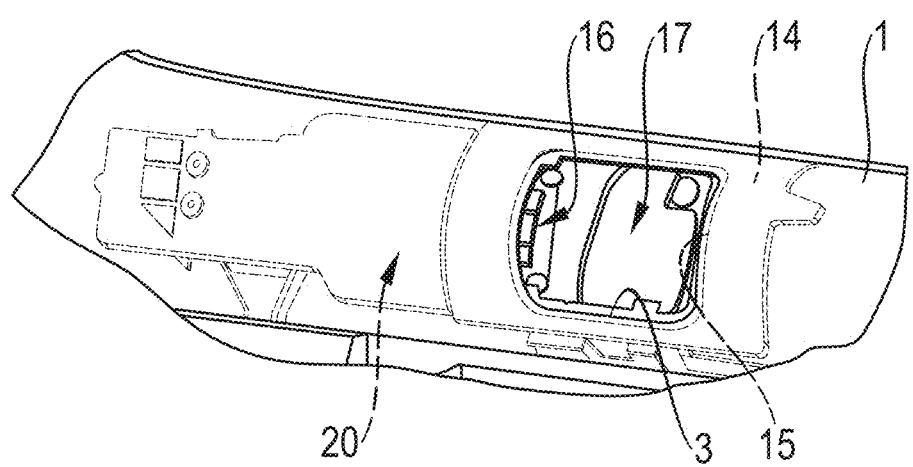
FIG. 3 depicts a transparent view of the bumper of FIGS. 1 and 2 with a drive-and-guide device fastened in the region of the charging port in the bumper.

In FIG. 3, a detail of the bumper 1 with the charging port 3 is shown in a transparent view. In this illustration, it can be seen that a drive-and-guide device 16 is integrated into the bumper 1. The drive-and-guide device 16 is integrated into a charging tray module 20 having a housing tray 36.

In the bumper 1, the drive-and-guide device 16 is used in order to move the cover 4 (also referred to as the charger cover) from its closed position shown in FIG. 1 into its open position, as indicated in FIG. 2, and vice versa. The cover or charger cover 4 can be automatically retracted inwardly, being electrically driven out of its closed position shown in FIG. 1 by means of the drive-and-guide device 16, as indicated in FIG. 2 by the arrow 8.

For this purpose, the drive-and-guide device 16 is equipped with an electromotive drive. Via a suitable guiding device, a rotational movement of the electromotive drive is, e.g., converted into corresponding opening movements and closing movements of the cover 4.

The drive-and-guide device 16 can be fastened directly inside the bumper 1. In the region of the charging port 3, an adapter frame 14 is fastened on the inside of the bumper 1. The adapter frame 14 comprises a port 15, through which the charging port 3 is enclosed in the bumper 1. The drive-andguide device 16 is fastened to the adapter frame 14 in the region of the charging port 3.

The fastening of the drive-and-guide device 16 to the adapter frame 14 is, e.g., performed in a bonded manner, in particular by adhesion. Alternatively or additionally, the drive-and-guide device 16 is screwed onto the adapter frame 14. The adapter frame 14 is fastened on the inside of the bumper 1. This fastening can also be produced in a bonded manner and/or with the aid of fastening means, such as screws.

The bumper 1 having the adapter frame 14 and the drive-and-guide device 16 represents an assembly which is, e.g., assembled by a supplier. The adapter frame 14, the drive-and-guide device 16, and the bumper 1 can be manufactured at different production sites. Assembly is then, e.g., performed by the supplier. The fully assembled unit can then be delivered to a vehicle manufacturer.

The charging socket 10, visible in FIG. 2 through the opened charging port 3 and having the mating face 11, is fastened to a support structure of the motor vehicle 2. When assembling the assembly supplied by the supplier, said structure is attached by the assembly port 17 via the charging socket 10 having the mating face 11. Once the assembly is correctly positioned relative to the charging socket 10 with the mating face 11, the bumper 1 can be attached to the support structure of the motor vehicle 2.

The bumper 1 and the adapter frame 14 are advantageously made of a plastic material. A housing of the drive-and-guide device 16 is also advantageously made of a suitable plastic material.

Figure 4:
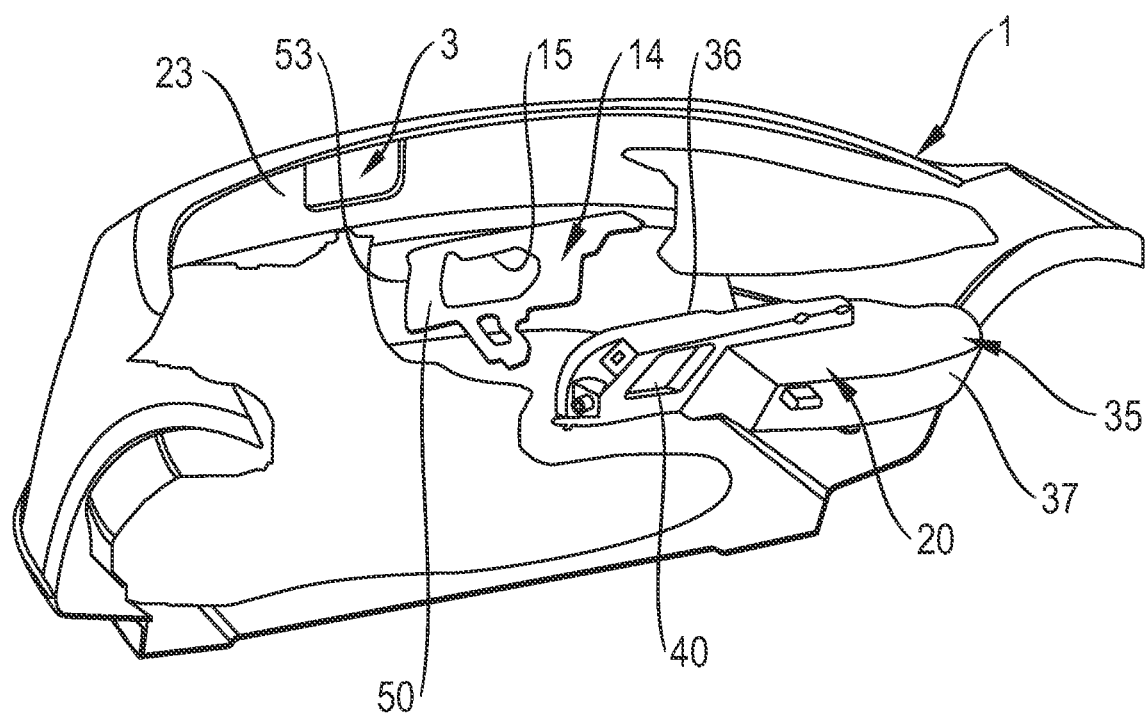
FIG. 4 depicts a detailed perspective view of the bumper with a charging tray module and an adapter frame.

In FIG. 4, it is illustrated how the charging tray module 20 with the drive-and-guide device integrated therein for the cover is mounted on the inside of the bumper 1. The charging tray module 20 can be mounted directly inside the bumper 1, e.g., in a bonded manner and/or with the aid of suitable fastening means. It is shown in FIG. 4 that an adapter frame 14 can also be used on the inside of the bumper 1 in order to fasten the charging tray module 20.

The adapter frame 14 is advantageously equipped on one side with a unit fastening point 50, at which the charging tray module 20 can be quickly and easily positioned and fastened. On a side facing away from the unit fastening point 50, the adapter frame 14 has a fastening interface 53 that is adapted to the bumper 1.

The adapter frame 14 provides the advantage that the same charging tray module 20 can be used for different bumpers or bumper variants. The fastening interface 53 of the adapter frame 14 thereby need only be adapted to the respective bumper or the respective bumper variant. Nothing need be changed on the charging tray module 20.

The adapter frame 14 comprises a port 15, which also serves as the charging port 3. The charging tray module 20 comprises a through-hole 40, which also serves as the charging port 3. A charging socket bearing reference character 10 in FIG. 2 is, e.g., attached to the charging tray module 20, which can be exposed or covered with the aid of the cover.

The charging tray module 20 comprises a housing 35 having a housing tray 36 and a housing rear wall 37. The through-hole 40 extends through the housing 35 with the housing tray 36 and the housing rear wall 37. The charging tray module 20 is mounted with its housing tray 36, directly or indirectly with the interposition of the adapter frame 14, on the inside of an outer skin 23 of the bumper 1.

In contrast to what is shown, the charging tray module 20 can also be mounted at another location of the outer skin 23 of a motor vehicle or a motor vehicle body. The charging tray module 20 can also in this case be mounted to a body of the motor vehicle, either directly or indirectly with the interposition of the adapter frame 14.

Figure 5:
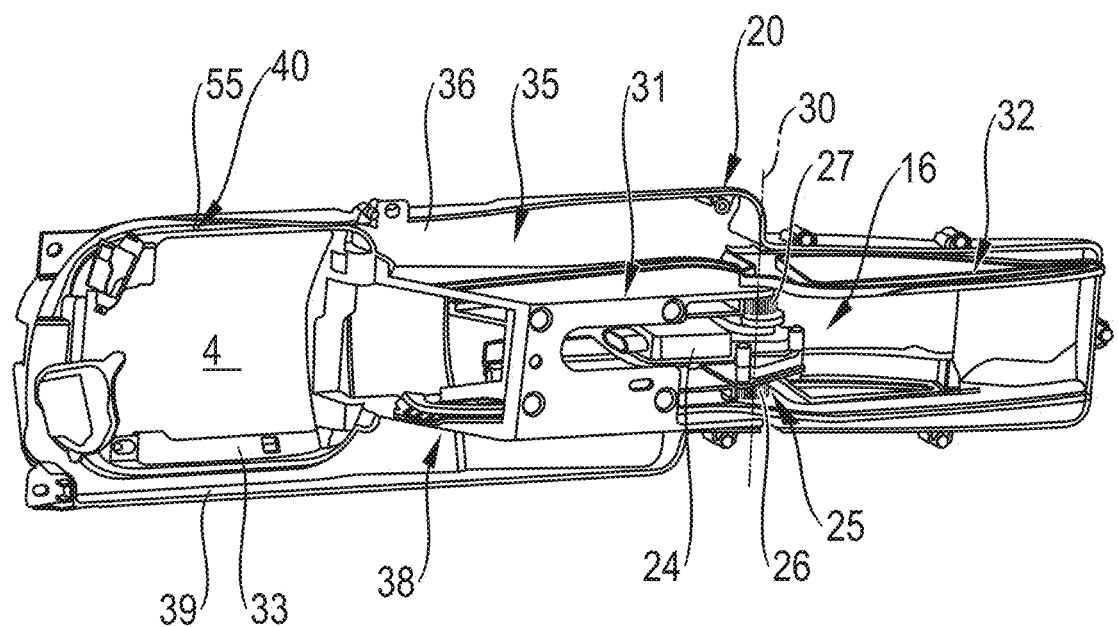
FIG. 5 depicts a perspective view of a drive-and-guide device for the cover integrated into the charging tray module.

In FIG. 5, the charging tray module 20 is shown in a perspective view, without the housing rear wall 37, in order to visualize the arrangement of the combined drive-and-guide device 16 in the housing 35 of the charging tray module 20. The drive-and-guide device 16 is fixed with its housing-fixed components to the housing tray 36, which is also referred to as the charging tray. The name "charging tray module" comes from the term "charging tray."

The drive-and-guide device 16 integrated into the charging tray module 20 comprises a gearwheel/rack combination 25 having two gearwheels 26, 27 and two racks 28, 29. The two gearwheels 26, 27 are electromotively driven about a common axis of rotation 30, e.g. by an electromotor 24, which is integrated into the charging tray module 20. The electromotor 24 is fastened internally on the housing tray 36.

Figure 6:
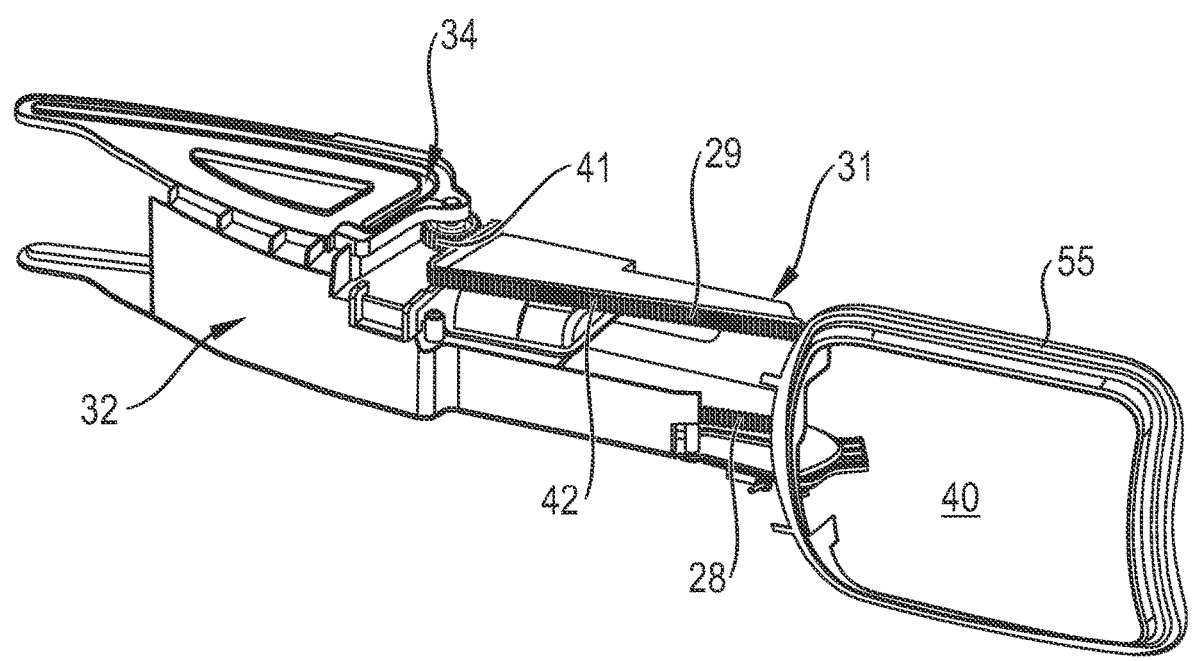
FIG. 6 depicts a perspective view of the combined drive-and-guide device of FIG. 5, but without a housing tray and without a support frame, as well as from a different perspective.

In FIG. 6, two racks 28, 29 of the gearwheel/rack combination 25 are visible. The two racks 8 and 29 each comprise a lifting portion 41 and a pushing portion 42. The lifting portion 41 is arranged substantially perpendicular to the pushing portion 42. The lifting portion 41 is used for a lifting movement of the cover 4. The pushing portion 42 serves for a pushing movement or translational movement of the cover 4.

The gearwheel 26 meshes with the rack 28. The gearwheel 27 meshes with the rack 29. A rotational movement of the gearwheels 26, 27 moves a movable guiding component 31 of the drive-and-guide device 16 relative to a housing-fixed guiding component 32.

The movable guiding component 31 comprises a support frame 33 to which the racks 28 and 29 are attached. The housing-fixed guiding component 32 comprises the electromotor 24. Relative movements of the movable guiding component 31 relative to the housing-fixed guiding component 32 are guided through a double slotted guide 34.

The housing 35 of the charging tray module 20 comprises a receptacle space 38 for the movable guiding component 31 with the support frame 33 and the cover 4. The receptacle space 38 is in this case designed and dimensioned such that the movable guiding component 31 can perform the movements without interference when the cover 4 moves between its open position and its closed position.

A frame 55 for the cover 4 is attached to one end of the support frame 33. This frame 55 is arranged in a fastening frame 39 formed on the housing tray 36.

The support frame 33, the fastening frame 39, and the frame 55 for the cover 4 comprise a through-hole 40, which is used as the charging port (bearing reference character 3 in FIG. 1) in the outer skin 23 and in the bumper 1. When the cover 4 is in its closed position, the through-hole 40 is closed. In its open position, the cover 4 exposes the through-hole 40.

REFERENCE CHARACTERS

1 Bumper
2 Motor vehicle
3 Charging port
4 Cover
5 Forward direction of travel
8 Opening movement
9 Charging interface or charging connector apparatus
10 Charging socket
11 Mating face
14 Adapter frame 15 Port
16 Drive-and-guide device
17 Assembly port
20 Charging tray module
23 Outer skin
24 Electric motor
25 Gearwheel/rack combination
26 Gearwheel
27 Gearwheel
28 Rack
29 Rack
30 Axis of rotation
31 Movable guidance component
32 Housing-fixed guidance component
33 Support frame
34 Double slotted guide
35 Housing
36 Housing tray
37 Housing rear wall
38 Receptacle space
39 Fastening frame
40 Through-hole
41 Lifting portion
42 Pushing portion
50 Unit fastening point
53 Fastening interface
55 Frame

What is claimed is:

1. An apparatus for exposing and covering a charging port of a vehicle, said apparatus comprising:
a cover that is movable between a closed position, in which the charging port is covered by the cover, and an open position, in which the charging port is exposed by the cover; and
a combined drive-and-guide device, which is configured to be moved inwardly from a closed position in relation to an outer skin of the vehicle that includes the charging port,
wherein the combined drive-and-guide device comprises a gearwheel/rack combination operatively connected to the cover and having two racks arranged in parallel and respectively meshing with two gearwheels, wherein the two gearwheels are electromotively driven about a common axis of rotation,
wherein each rack comprises a respective lifting portion and a pushing portion, wherein the lifting portion and the pushing portion each constitute gear teeth on the respective racks.

2. A motor vehicle comprising the charging port and the apparatus of claim 1, wherein the apparatus is mounted both from behind and onto the outer skin of the motor vehicle, which outer skin delimits the charging port.

3. The apparatus according to claim 1, wherein each rack is fixedly connected to the cover.

4. The apparatus according to claim 1 further comprising a motor for driving the two gearwheels, wherein the motor is positioned between the racks.

5. The apparatus according to claim 1, wherein the two racks are fixedly connected to a movable guidance component, which cooperates with a housing-fixed guidance component.

6. The apparatus according to claim 5, wherein a support frame for the cover is attached to the movable guidance component.

7. The apparatus according to claim 6, wherein the combined drive-and-guide device comprises a double slotted guide for the support frame.

8. The apparatus according to claim 6, wherein the combined drive-and-guide device is integrated into a charging tray module having a housing comprising a housing tray that delimits a receptacle space for the support frame when the cover is in its closed position.

9. The apparatus according to claim 8, wherein the combined drive-and-guide device is attached to the housing tray.

10. The apparatus according to claim 8, wherein the housing tray comprises a fastening frame that surrounds the cover, wherein the fastening frame is attached to the support frame in a closed position of the cover.

11. The apparatus according to claim 8, wherein the housing tray comprises fastening means for fastening the charging tray module in or on a motor vehicle.

12. The apparatus according to claim 1, wherein, for each rack, the lifting portion is oriented at an angle with respect to the pushing portion.

13. The apparatus according to claim 12, wherein, for each rack, the lifting portion intersects the pushing portion at a corner.

14. The apparatus according to claim 12, wherein, for each rack, the lifting portion extends in a first direction and the pushing portion extends in a second direction that differs from the first direction.

* * * * *